(12) United States Patent
Grubb

(10) Patent No.: US 8,711,839 B2
(45) Date of Patent: Apr. 29, 2014

(54) DEVICE AND METHOD TO AUTOMATICALLY CONFIGURE PORT FORWARDING

(75) Inventor: David Grubb, Doylestown, PA (US)

(73) Assignee: General Instrument Corporation, Horsham, PA (US)

(*) Notice: Subject to any disclaimer, the term of this patent is extended or adjusted under 35 U.S.C. 154(b) by 2520 days.

(21) Appl. No.: 10/836,725

(22) Filed: Apr. 29, 2004

(65) Prior Publication Data

US 2005/0243801 A1    Nov. 3, 2005

(51) Int. Cl.
*H04L 12/66* (2006.01)
(52) U.S. Cl.
USPC ......................................................... 370/352
(58) Field of Classification Search
USPC .......... 709/220, 221; 370/351–356, 389, 392; 455/500
See application file for complete search history.

(56) References Cited

U.S. PATENT DOCUMENTS

| | | | |
|---|---|---|---|
| 7,106,739 B2* | 9/2006 | Beier | 370/392 |
| 7,328,033 B2* | 2/2008 | Rappaport et al. | 455/500 |
| 2003/0101244 A1* | 5/2003 | Lockridge et al. | 709/220 |
| 2004/0049714 A1* | 3/2004 | Marples et al. | 714/43 |
| 2004/0121648 A1* | 6/2004 | Voros | 439/535 |
| 2004/0133689 A1* | 7/2004 | Vasisht | 709/228 |
| 2005/0018651 A1* | 1/2005 | Yan et al. | 370/352 |
| 2005/0021603 A1* | 1/2005 | Yokomitsu et al. | 709/203 |

OTHER PUBLICATIONS

Engst and Fleishman, The Wireless Networking Starter Kit, Dec. 9, 2002, Peachpit Press, Chapter Buying Your Wireless Network section Buying a Wireless Gateway-Port Forwarding and Triggers.*

* cited by examiner

*Primary Examiner* — Sonia Gay
(74) *Attorney, Agent, or Firm* — Lori Anne D. Swanson

(57) ABSTRACT

An inventive Network Address Translation ("NAT") device and method for automatic port forwarding whenever said NAT device detects that only one Local Area Network ("LAN") IP address has been leased by its DHCP server is disclosed. Under this condition, the inventive NAT device automatically configures all ports to be forwarded (except those that may be reserved for applications running in the inventive NAT device), to the single leased LAN IP address. This minimizes, if not eliminates, the conventional address configuration required when a NAT device is added to an existing network.

9 Claims, 2 Drawing Sheets

DEVICE AND METHOD TO AUTOMATICALLY CONFIGURE PORT FORWARDING

FIELD OF THE INVENTION

The present invention relates to digital data networks. More specifically, the present invention relates to data priority, routing, and forwarding in a digital data network.

BACKGROUND OF THE INVENTION

Broadband services amongst small businesses and home consumers are increasing at a rapid pace. Consistent with this trend is the proliferation of broadband devices which increase end users' capabilities and functionalities, e.g., voice over Internet Protocol ("VOIP") devices.

With the availability of these expanded functionality devices comes complexity in terms of consumer integration of such devices into an already existing network, as the average consumer knows little about configuring a new device for an existing network. Thus, to date, new broadband device dissemination usually requires an extensive support staff (help desk) to assist end users in integrating these new devices into their network, as well as ensuring that previously existing network devices function as they did prior to the new addition.

This problem is exacerbated by the inclusion of a Dynamic Host Configuration Protocol ("DHCP") server in new broadband devices. A DHCP server is typically included in new broadband devices as to provide any necessary routing; the assumption being that most homes simply have one personal computer ("PC") connect to broadband gateway. A broadband device containing a DHCP server is typically referred to as a Network Address Translation Device or "NAT" device. The insertion of a NAT device (inserted to be directly connected to the gateway) into even a single PC environment places that single PC, which previously had a wide area network ("WAN") addressable Internet Protocol ("IP") address, outside the direct view of the WAN because the NAT device would have leased (given) the PC a private address upon request. Thus, for example, if the single PC was being used as a web server, such functionality would be inoperable after the insertion of the NAT device. Currently, the only way to resolve the above presented common scenario is for the end user to manually configure the newly inserted NAT device by means of port forwarding to the PC, for example. As many consumers are not network professional, this often results in complexity and frustration. Further, vendors of such NAT devices will most likely be required to provide some type of telephone or Internet help desk function to assist consumers in the above recited manual port forwarding configuration.

Another common scenario exists when a previously ("first") NAT device already exists in the network and a new ("second") NAT device is inserted between the broadband gateway and the first NAT device. Here, the second NAT device's inclusion would render the first NAT device, as well as all devices connected thereto, inoperable because the first NAT device would be invisible to the WAN. (A common reason as to why it be desirable to insert such a second NAT device in between the gateway and first NAT device is for bandwidth purposes. A VOIP NAT device is an example of such a second NAT device where this placement would be desirable.) Currently, the only way to resolve the above presented common scenario is to manually configure the second NAT device to port forward to the first NAT device. Again, as many consumers are not network professionals, this procedure often results in complexity and frustration. Further, again, vendors of such NAT devices will most likely be required to provide some type of telephone or Internet help desk function to assist consumers in the above recited manual port forwarding configuration.

What is needed is a device and method to easy the confusion and complexity of adding a new NAT device to a pre-existing network configuration.

SUMMARY OF INVENTION

An object of the present invention is to provide for automatic port forwarding by a NAT device, when such NAT device is introduced into a previously existing network.

In order to achieve this objective, as well as others which will become apparent in the disclosure below, the present invention provides for an inventive NAT device and method for automatic port forwarding whenever said inventive NAT device detects that only one local area network ("LAN" or "private") IP address has been leased from its DHCP server. Under this condition, the inventive NAT device automatically configures all ports to be forwarded (except those that may be reserved for applications running in the NAT device), to the one leased LAN IP address. This minimizes, if not eliminates, the traditional address configuration required when a NAT device is added to an existing network.

In accordance with a first exemplary embodiment of the present invention, when said inventive NAT device is inserted between a gateway device and a single PC (previously directly connected the gateway device) and only one private address has been leased by the inventive NAT's DHCP server, the method causes the inventive NAT device to forward all ports, except those reserved for the inventive NAT's application(s), e.g., VOIP applications when the NAT is a VOIP device, to the single PC.

In accordance with a second exemplary embodiment of the present invention, where an inventive ("second") NAT device is inserted into a network which already had a previously existing conventional ("first") NAT device, between the gateway and the first NAT device, and only one LAN IP address has been leased by the inventive NAT's DHCP server, the method cause the inventive NAT device to forward all ports, except those reserved for the inventive NAT's application(s), e.g., VOIP application when the NAT is a VOIP device, to the first NAT device.

Thus, the inventive NAT device and method of the present invention provides for automatic port forwarding whenever the inventive NAT device detects that only one LAN IP address has been leased by its DHCP server. This minimizes, or eliminates, the need for a consumer to configure a NAT device for port forwarding.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DESCRIPTION OF A PRESENTLY PREFERRED EMBODIMENT

Figure 1:
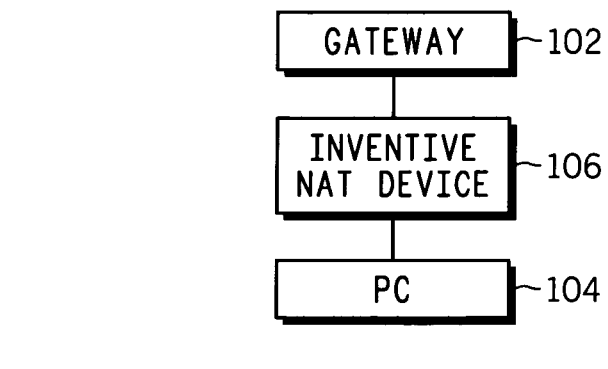
FIG. 1 is an illustration of a system for automatic port forwarding by a NAT device in accordance with an exemplary system of the present invention.

Referring to FIG. 1, system 100 is shown. System 100 is includes a broadband gateway device 102, inventive NAT device 106, and a single PC 104. Inventive NAT device 106 is the object of the present invention. It is assumed that prior to the inclusion of inventive NAT device 106, single PC 104 was directly connected to gateway 102 and shared the same WAN address as gateway 102. Further, the inventive NAT device 106 contains at least a DHCP server, application specific component (e.g., VOIP application), and a port forwarding engine/component.

Figure 2:
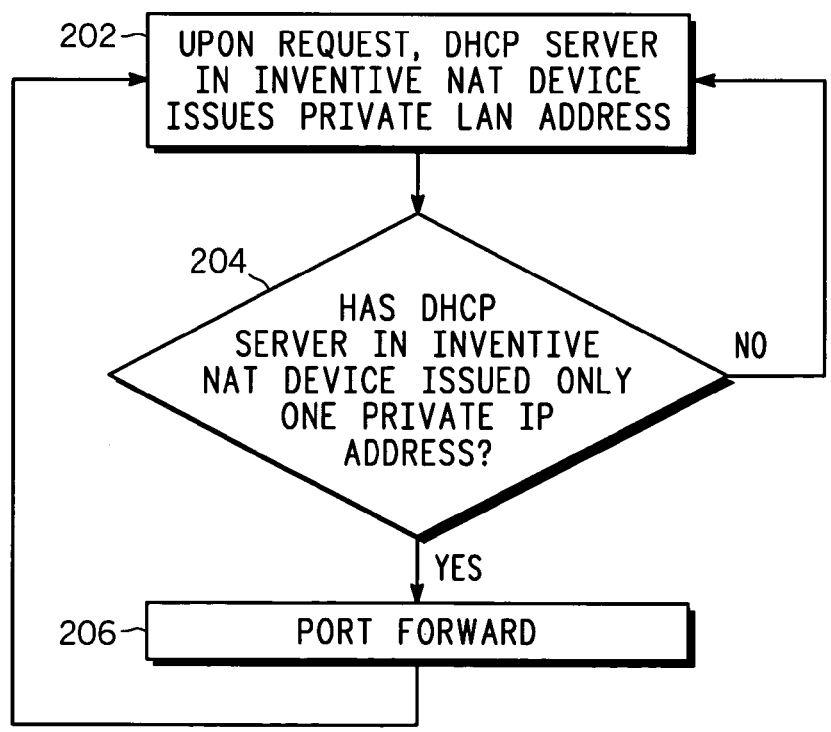
FIG. 2 is a flow diagram showing the basic process flow for automatic port forwarding by a NAT device in accordance with the exemplary embodiment of the present invention.

Referring to FIG. 2, after insertion of the inventive NAT device 106, the PC, which previously communicated over the Internet, is invisible to the WAN, as it sits on the LAN side of NAT device 106. In accordance with an exemplary embodiment of the present invention, when NAT device 106 is inserted between the gateway 102 and single PC 104, upon request of single PC 104, the DHCP server in NAT device 106 provides a private address to the single PC 104, in step 202. If only one private address if given out by the DHCP server of the NAT device 106, in step 204, the NAT device 106 forwards all ports, except those ports that may be reserved for applications running in the NAT device 106, e.g., a VOIP port if NAT device 106 is a VOIP device, to the single PC, in step 206. In this way, the single PC 104 is in the same configurative position after the insertion of inventive NAT device 106, as it was before the insertion of inventive NAT device 106. In the event that the DHCP server in the inventive NAT device 106 leases a second private address, the port forwarding would cease as indicated in the feedback loop of FIG. 2.

Figure 3:
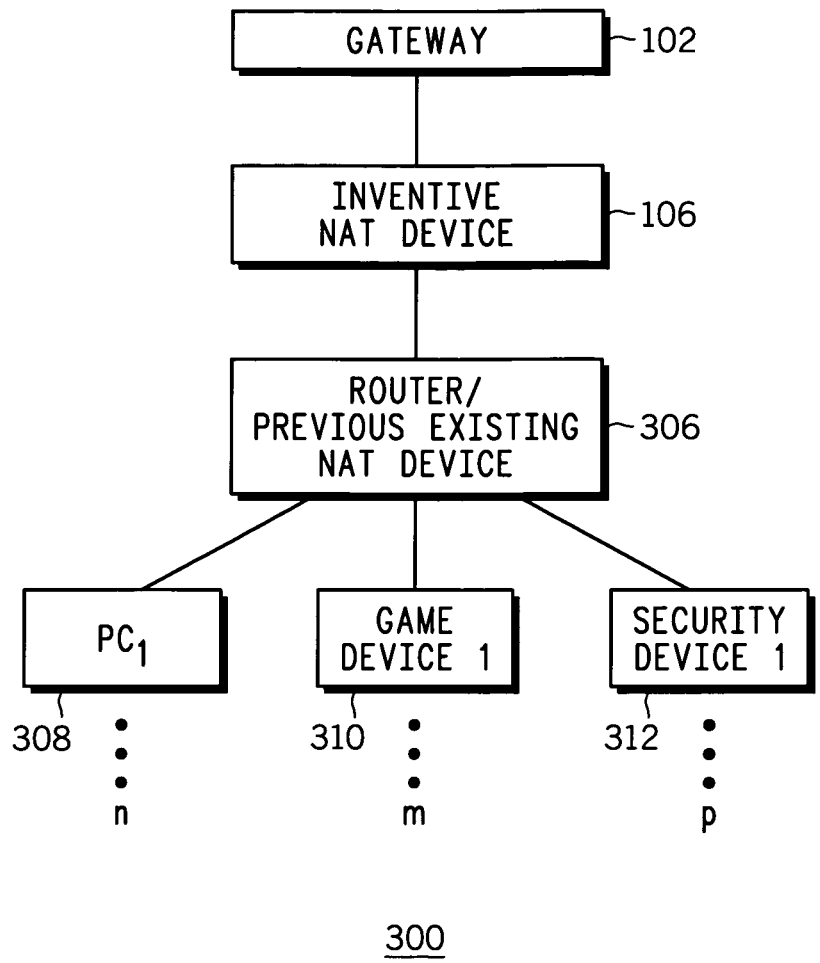
FIG. 3 is an illustration of a system for automatic port forwarding by a NAT device in accordance with a second exemplary system of the present invention.

Referring to FIG. 3, system 300 is shown. System 300 is includes a broadband gateway device 102, a previously existing traditional NAT device 306, and the inventive NAT device 106. Further, the previously existing traditional NAT device 306 may alternatively be a router, or other gateway device capable of routing data to multiple devices connected thereto. Previously existing traditional NAT device 306 may be interconnected to and routing data to one or a plurality of other network devices, such as one or more PCs 308, gaming devices 310, or security monitoring devices 312, etc. Inventive NAT device 106 is the object of this second exemplary embodiment of the present invention. It is assumed that prior to the inclusion of inventive NAT device 106 of the present invention, previously existing traditional NAT device 306 was directly connected to gateway 102 and shared the same WAN address as gateway 102.

Referring back to FIG. 2 (as the functionality (method of operation) of the inventive NAT device 106 is identical in both this second and the above recited exemplary embodiments), after insertion of the inventive NAT device 106, the previously existing traditional NAT device 306, which previously communicated over the Internet, is invisible to the WAN, as it sits on the LAN side of inventive NAT device 106. In accordance with an exemplary embodiment of the present invention, when inventive NAT device 106 is inserted between the gateway 102 and previously existing traditional NAT device 306, upon request the DHCP server in the inventive NAT device 106 provides a private address to the previously existing traditional NAT device 306, in step 202. If only one private address is leased (given) out by the DHCP server of the inventive NAT device 106, in step 204, the NAT device 106 forwards all ports, except those ports that may be reserved for applications running in the NAT device 106, e.g., a VOIP port if NAT device 106 is a VOIP device, to the existing traditional NAT device 306, in step 206. In this way, the previously existing traditional NAT device 306 is in the same configurative position after the insertion of inventive NAT device 106, as it was before the insertion of inventive NAT device 106. Again, in the event that the DHCP server in the inventive NAT device 106 leases a second private address, the port forwarding would cease as indicated in the feedback loop of FIG. 2.

Thus, the inventive method of the present invention provides for automatic port forwarding by a NAT device whenever the NAT device detects that only one LAN IP address has been leased by its DHCP server. This minimizes, or eliminates, the need for a consumer to configure the NAT device for port forwarding.

Although the invention has been described herein by reference to an exemplary embodiment thereof, it will be understood that such embodiment is susceptible of modification and variation without departing from the inventive concepts disclosed. For example, the inventive NAT device 106 can perform automatic port forwarding whenever it leases (gives out) only one LAN/private address, regardless of whether the recipient of such private address is a single PC, or a single previously existing NAT device or router. All such modifications and variations, therefore, are intended to be encompassed within the spirit and scope of the appended claims.

I claim:

1. A network translation device (NAT) for automatic port forwarding, said device comprising:
   a dynamic host configuration protocol server visible to a wireless area network (WAN) for providing at least one private local area network address; and
   a forwarding engine coupled to said dynamic host configuration protocol server for forwarding ports to the at least one private local area network address,
   wherein the network translation device:
      detects whether either a single private local area network address is leased by the dynamic host configuration protocol server or more than one private local area network address is leased by the dynamic host configuration protocol server;
      in response to detecting that the dynamic host configuration protocol server is leasing the single private local area network address, enables automatic port forwarding via the forwarding engine to forward from the WAN all but NAT application reserved ports to the single private local area network address in response to detecting that the dynamic host configuration protocol server is leasing more than one private local area network address, ceases the automatic port forwarding.

2. The device of claim 1 further comprising an application component, said application component coupled to said server, said application component performing application specific functions, said reserved ports being reserved for said application component.

3. The device of claim 2, wherein said application component comprises voice over Internet protocol functionality.

4. The device of claim 2, wherein said application component comprises local printing functionality.

5. A method for automatic port forwarding in a network translation device, said method comprising:
   detecting via the network translation device whether either a single private local area network address is leased by a dynamic host configuration protocol server or more than one private local area network address is leased by the dynamic host configuration protocol server;
   in response to detecting that the dynamic host configuration protocol server is leasing the single private local area network address, automatically forwarding via the network translation device all but network translation device specific application reserved ports to the single private local area network address; and in response to detecting that the dynamic host configuration protocol server is leasing more than one private local area network address, ceasing the automatic port forwarding of the all but network translation device specific application reserved ports to the single private local area network address.

6. The method of claim 5, wherein the reserved ports are reserved for an application native to said network translation device.

7. The method of claim 6, wherein said application comprises voice over Internet protocol functionality.

8. The method of claim 6, wherein said application comprises local printing functionality.

9. The method of claim 5, wherein the network translation device specific application reserved ports comprise all ports except those reserved to said network translation device for an application therein.

\* \* \* \* \*